J. W. RITTENBERRY.
WAGON.
No. 190,622. Patented May 8, 1877.
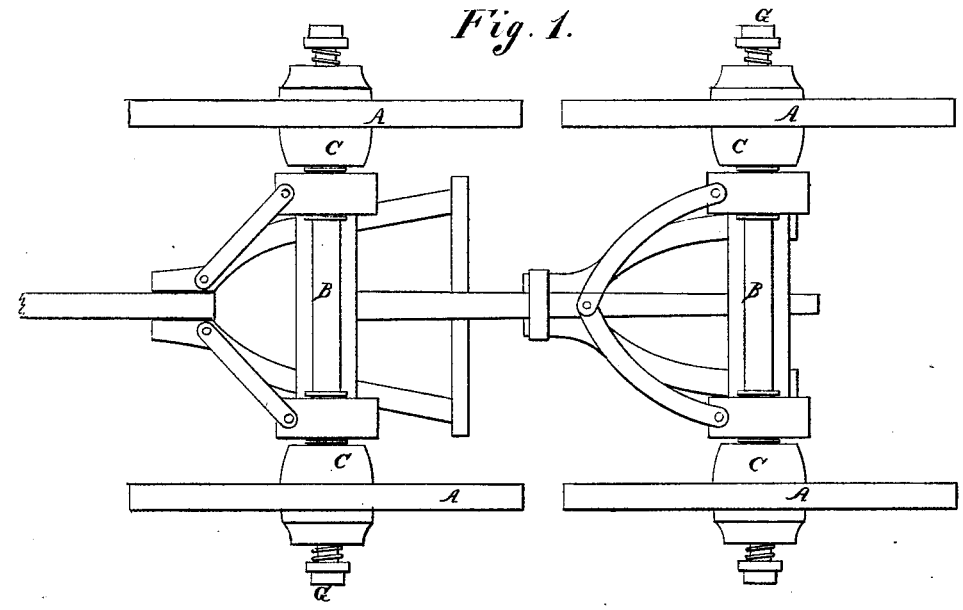
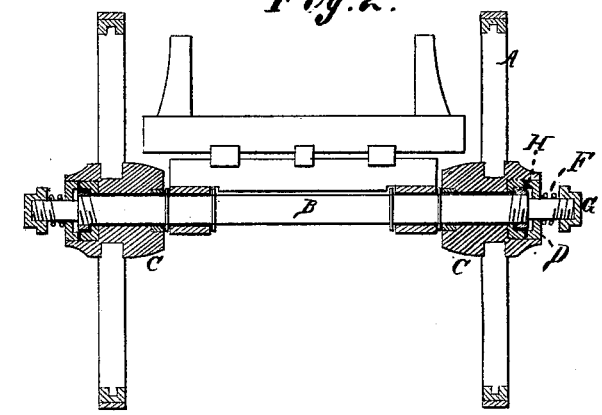
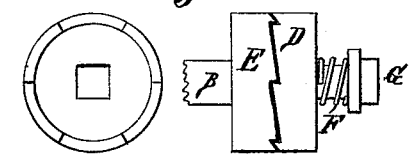
WITNESSES:
D. R. Cowe
Jno. P. Jacobs.
Jno. W. Rittenberry
INVENTOR.
J. McC. Perkins
ATTORNEY.

UNITED STATES PATENT OFFICE.

JOHN W. RITTENBERRY, OF CLOVERDALE, TENN., ASSIGNOR OF A PART OF HIS RIGHT TO W. A. BELL AND A. B. COLWELL, OF SAME PLACE.

IMPROVEMENT IN WAGONS.

Specification forming part of Letters Patent No. 190,622, dated May 8, 1877; application filed January 25, 1877.

*To all whom it may concern:*

Be it known that I, JOHN W. RITTENBERRY, of Cloverdale, in the county of Dickson and State of Tennessee, have invented certain new and useful Improvements in Wagons; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claim.

The object of my invention is to prevent the grinding, pinch, or friction of the wheels with the axle when making curves or passing small obstructions, by novel devices which permit the inner wheel to remain stationary or turn backward, while the outer wheel turns forward, as will hereafter be more fully described.

Figure 1 is a bottom view of my invention. Fig. 2 is a sectional view through the wheel; and Fig. 3 is a detailed view of the ratchet, spring, and nut.

A represents the wheels; B, the axle-tree; C, the hub; D, the ratchet-cap, which is removable and moves with the spindle; E, the ratchet-cap, which gears with D, and is fastened in the outer end of the hub C; F, the spring between the nut G and the cap D, and H an inner nut, to keep the water and dirt from collecting in the hub, to prevent the wheel from moving outwardly too far on the axle.

From H to the nut G the axle is square. The cap D has a central square opening, which causes it to turn with the axle.

The operation of my improved axle is thus: When the wagon moves forward the axle turns with the wheel. This is caused by the ratchet-cap D, which engages with E, which is fixed in the wheel; but when the wagon makes a curve and one wheel is stationary, the caps D and E are disengaged and the wheel moves backward, while the other and outer wheel moves forward with the axle. When the wagon again makes a forward movement the caps D and E are again geared, and both wheels move together forward with the axle.

I do not claim, broadly, the spring and ratchet arrangement on an axle-tree, as this has been used before; but What I do claim, and desire to secure by Letters Patent, is—

In a wagon, the axle-tree B, the nut G, and the spring F, in combination with the fixed clutch E, gearing with the clutch D, the clutch D being provided with a chamber on its inner end for the reception of the nut H, and with a square hole in its center, to fit the squared part of the axle-tree between the nut H and the nut G, substantially as described, and for the purposes set forth.

In testimony that I claim the foregoing I have hereunto set my hand this 21st day of September, 1876.

JOHN W. RITTENBERRY.

Witnesses:
 ISAAC M. BOWERS,
 T. O. HUTTON.